United States Patent [19]

Stein et al.

[11] 3,969,327
[45] July 13, 1976

[54] THERMOSETTING ACRYLIC POWDERS

[75] Inventors: Ralph Stein; Willy Demarteau, both of Brussels; Georges Slinckx, Bierges; August Vrancken, Dworp, all of Belgium

[73] Assignee: U.C.B., Societe Anonyme, Brussels, Belgium

[22] Filed: July 11, 1974

[21] Appl. No.: 487,800

[30] Foreign Application Priority Data
July 13, 1973 United Kingdom............... 33431/73

[52] U.S. Cl.................................. 526/1; 260/42.29; 260/830 R; 260/837 R; 260/873; 526/4; 526/5; 526/6; 526/12; 526/14; 526/49

[51] Int. Cl.²................... C08F 2/38; C08F 220/06; C08F 220/56; C08J 3/12

[58] Field of Search.................. 260/78.5 R, 78.5 B, 260/78.5 E, 80.3 R, 80.3 N, 80.73, 80.8, 80.81, 42.29, 86.1 R, 80 P, 830 R, 837 R, 873

[56] References Cited
UNITED STATES PATENTS

| | | | |
|---|---|---|---|
| 3,732,190 | 5/1973 | Balle............................. | 260/78.5 R |
| 3,741,272 | 6/1973 | Ullrich et al........................ | 159/2 E |
| 3,752,793 | 8/1973 | Arlt et al.......................... | 260/78.5 T |
| 3,862,096 | 1/1975 | Kitamura et al.................. | 260/80.73 |
| 3,873,495 | 3/1975 | Appel et al....................... | 260/42.29 |
| 3,876,587 | 4/1975 | Matsui et al.................... | 260/78.4 D |

*Primary Examiner*—John Kight, III
*Attorney, Agent, or Firm*—Wenderoth, Lind & Ponack

[57] ABSTRACT

Telechelic or semi-telechelic polymers, the average composition of which has the $(Y)_y$ formula

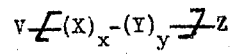

wherein
V is a hydrogen atom or Z,
X is the radical originating from an ethylenically monomer carrying a polymerizable $>C = C<$ group and at least one other reactant group selected from the group consisting of $OH_2$

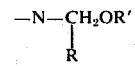

(R and R' being a hydrogen atom or a lower alkyl radical), COOH or anhydride and

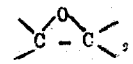

Y is the radical originating from an ethylenically unsaturated monomer carrying only a $>C = C<$ group,
Z is a hydrocarbon radical carrying at least one reactive group selected from OH, COOH and $NH_2$,
$x$ is a number between 0 to 10,
$y$ is the required number of molecules of Y to ensure that the molecular weight of the polymer chain is between 2000 and 8000,
the $x$ radicals X and the $y$ radicals Y being statistically distributed along the $-(X)_x-(Y)_y-$ polymer chain according to polymerization kinetics, and thermosetting acrylic powders comprising said polymers as binder.

13 Claims, No Drawings

THERMOSETTING ACRYLIC POWDERS

The present invention is concerned with thermosetting acrylic compositions which are in powder form and can be used for the production of coatings and mouldings and with the linear or branched, telechelic or semi-telechelic polymers constituting the binder in said compositions.

The importance of these thermosetting acrylic compositions is that they give coatings which are cross-linked in their final state and which thus become practically insoluble and infusible, which is not true of coatings formed from thermoplastic film-forming compositions, which remain fusible and sensitive to solvents.

Initially, thermosetting coating compositions were in the form of a solution of the thermosetting resin in an organic solvent. After application of the solution to the substrate which is to be coated, the solvent was evaporated and the resin film thus applied was hardened by heat.

This method of applying coatings has disadvantages due to the use of solvents, which constitute a permanent danger of fire, explosion and poisoning. It is for this reason that attempts have been made to develop thermally cross-linkable film-forming resinous compositions which do not contain solvents; this research work has finally led to the production of thermosetting compositions which are in the form of powders. The advantages of these powders are numerous; on the one hand, the problem of solvents is completely overcome and, on the other hand, the thermosetting powders are completely utilised because only the powder in direct contact with the substrate is retained by the latter, while the excess powder can be recovered and reused. Finally, by this method of coating it is possible to obtain a relatively thick coat in a single application, which is not the case when using a solution of thermosetting polymer in an organic solvent.

Various techniques exist for the application of thermosetting powders, the main techniques comprising the use, on the one hand, of a fluidized bed and, on the other hand, of an electrostatic gun. The fluidized bed process consists in pre-heating the object to be coated to a temperature above the melting temperature of the powder which is to be applied, then introducing it into a fluidized mass of the pulverulent thermosetting composition so that the surface of the object is covered with particles of this composition. The object thus coated is then baked in the oven in order to spread the coating film over the object and to render the film insoluble, infusible and impart the final mechanical properties thereto. In the case of the electrostatic gun process, which permits the production of coatings having thicknesses of up to 100 microns, it is not necessary to preheat the substrate before the coating operation. In this technique, the powder is charged at a potential of the order of 50,000 volts and is applied by means of a spray gun. The powder thus charged with electricity is applied in excess to the substrate which is to be coated, in such a manner as to cover its entire surface. Of the particles of powder sprayed in this manner on to the substrate, only those which are in direct contact with the latter are fixed, the others not being retained because of the insulating effect of the powder already fixed. The object coated with powder is then subjected to baking to melt the particles to form a uniform film and, at the same time, to cross-link the latter with the object of imparting to it its final mechanical and chemical properties.

Thermosetting pulverulent compositions have already been widely used in the manufacture of domestic electric appliances, garden furniture, bicycles, accessories for the motor car industry, etc. They generally contain organic thermosetting binders, fillers, pigments, catalysts and various additives in order to adapt their properties to their intended use.

It is difficult to prepare completely satisfactory thermosetting pulverulent compositions, because they have to comply with criteria which are frequently contradictory. Thus, the powders must not re-agglomerate during handling, transport and storage, which implies that, if the powder contains an amorphous binder, this binder must have a sufficiently high glass transition temperature. On the other hand, in order to enable the powder particles to coalesce and form a perfectly homogeneous and uniform film, the softening temperature of the binder must be sufficiently low to effect good wetting of the pigments and other solid materials accompanying the binder in the formulation of these pulverulent thermosetting compositions. Furthermore, the powder must be capable of melting at a high temperature, preferably between 140° and 250°C., in order to form a regular film before the commencement of the cross-linking reaction which leads to the final hardening. Finally, in order to obtain good spreading of the molten film over the surface of the substrate, it is necessary that the surface tension and also the viscosity of the organic binder in the molten state should be sufficiently low. Taking into account all the requirements indicated above, it is generally accepted that a suitable binder for a pulverulent thermosetting composition must have a glass transition temperature (Tg) higher than 40°C. but lower than 80°C., a softening temperature between 70° and 130°C. and a viscosity in the molten state of between 10 and 5,000 poises at 180°C..

The glass transition temperature (Tg) is the temperature at which a vitreous material loses its rigidity and its hardness, having a behaviour similar to that of an elastomer; more specifically, it is the temperature at which this material has maximum mechanical damping at low frequency, for example at one cycle per second.

Viscosity in the molten state ($\mu_T$) is related to the average molecular weight (MW) and to the glass transition temperature Tg by the equation of Williams Landel and Ferry $$\log \mu_T = a \log MW - \frac{17.44\ (T-T_g)}{51.6 + T-T_g} + K$$

in which $a$ and K are constants.

The result of this is that the polymers must have relatively low molecular weights, these preferably being between 2,000 and 8,000 (determined by vapor pressure osmometry) when baking is effected between 140° and 250°C. (T).

Different types of pulverulent thermosetting compositions exist, the oldest being based on epoxy resins. However, resistance to weathering leaves much to be desired because of a rapid flouring phenomenon which results in a loss of gloss followed by disintegration of the coating in the form of a fine powder.

Another type is based on polyesters. This constitutes a considerable improvement compared with the epoxy type because of its better resistance to weathering, but it does not represent an ideal solution. The sensitivity of polyesters to hydrolysis is, in fact, well known. Furthermore, the difficulty which is encountered in the adjustment of a sufficiently high Tg to overcome the tendency to reagglomerate during storage constitutes a lack of flexibility both in respect of manufacture and in respect of use.

These various difficulties do not occur in the case of thermosetting powders in which the binder is formed by an acrylic copolymer, while, in addition, the coatings obtained with these powders have a remarkable stability to light and to weather.

Processes for the preparation of thermosetting acrylic powders for the purpose of electrostatic spraying and of moulding have already been described in various patents and publications. All these acrylic powders have in common the characteristic that the acrylic binder is composed of a polymer chain in which the reactive groups for cross-linking, also called cross-linking groups, are distributed statistically. The statistical distribution of cross-linking groups in the chain has the disadvantage that macromolecules having a high content of cross-linking groups adjoin macromolecules which, in the limiting case, contain no such groups. This phenomenon is intensified by the fact that the molecular weights of the materials used for the preparation of thermosetting powders are necessarily low. To this is added the fact that, in the course of polymerisation, the original composition of the binder changes, thus increasing still further the heterogeneity of distribution of the reactive sites by kinetic effect. Finally, because of steric hindrance, the cross-linking sites towards the middle of the molecule are less reactive than those located near the end of the chain. All this has the result that the final coating films deposited on the substrate are composed of too highly cross-linked portions alternating with insufficiently cross-linked portions.

To summarise, Flory's theory ("Principles of Polymer Chemistry", pages 347 to 374, Cornell University Press, New York, 1953) shows that the insolubilization of a resin having non-statistical distribution of the cross-linking sites starts from two bonds per chain. In order to obtain maximum insolubilization, the statistical distribution of the sites makes it necessary to operate with a far higher proportion of functional groups than the theoretical minimum, considering the low molecular weights employed. This results in heterogeneity in the cross-linking density, with the formation of high density cores which impart poorer mechanical properties to the hardened polymer.

The object of the present invention is to obviate the disadvantages of statistical distribution of cross-linking sites in the binder of thermosetting acrylic powders.

According to the present invention, this object is achieved by using a thermosetting acrylic binder which contains cross-linking sites not only over the entire length of the polymer chain but also at at least one end of the latter. In other words, a semi-telechelic and/or telechelic acrylic polymer is used as binder for thermosetting acrylic powders.

In the context of the present invention polymers are said to be semi-telechelic and telechelic, respectively, when one end and both ends, respectively, of the linear macromolecular chain has or have at least one cross-linking site.

The introduction of telechelic groups into a thermosetting resin makes it possible to obviate, to a large extent, the previously described disadvantages entailed by the purely statistical distribution of functional groups in the macromolecular chain.

First, the curve of distribution of the reactional groups per molecule becomes narrower and is offset in the upward direction by one or more units in the respective cases of semi-telechelic, telechelic or polytelechelic resins.

The result of this is that the probability of having unbonded or weakly bonded molecules in the network after cross-linking is practically eliminated and that solvent-resistant characteristics are thereby automatically improved.

The elimination in a polymer of non-cross-linking chain ends, wholly in the case of telechelic resins and partially in the case of semi-telechelic resins, provides immediate advantages. First, the accessibility of the terminal groups imparts to them an increased cross-linking reactivity. This makes it possible to use proportions of cross-linking agent which are closer to the theoretical values. Secondly, a higher gelling rate is obtained than in the case of a statistical resin, for an equal number of sites. In other words, cross-linking is achieved at a lower level of cross-linking groups, which, moreover, are more regularly distributed over the entire length of the polymer chains. In the tridimensional network, formed by cross-linking these polymers, using eventually an additional cross-linking agent, this results, at a molecular level, in the formation of a mesh of more homogeneous dimensions which is distributed more uniformly in the network. The effects thereof on mechanical properties is well known.

The optimum effect is obtained with an entirely telechelic linear or branched resin but the improvement is already considerable in the case of a semi-telechelic linear or even branched structure which contains only one telechelic group.

Finally, in cases where the terminal cross-linking group is chemically different from the cross-linking groups along the length of the chain, judicious selection of the elements of the cross-linking system makes it possible to obtain sequenced cross-linking; in a first phase, the terminal group reacts with a cross-linking group of the chain or with the cross-linking agent and the chain is lengthened, practically without insolubilization. The cross-linking itself does not take place until later on, in a second phase, by interaction of the cross-linking groups of the chain, with or without the intervention of the cross-linking agent.

The present invention thus provides linear or branched, telechelic or semi-telechelic polymers, which are particularly suitable for use as binder in acrylic powders, the average composition of which has the following general formula:

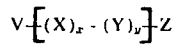

wherein
V is a hydrogen atom or Z,
X is the radical originating from an ethylenically-unsaturated monomer carrying a polymerizable $>C=C<$ group and at least one other reactant group selected from OH,

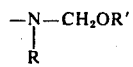

(R and R' being a hydrogen atom or a lower alkyl radical), COOH or anhydride and

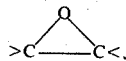

Y is the radical originating from an ethylenically-unsaturated monomer carrying only a polymerizable >C=C< group, Z is a hydrocarbon radical carrying at least one reactive group selected from OH, COOH or $NH_2$, x is a number of from 0 to 10, and y is the required number of molecules of Y to ensure that the molecular weight of the - polymer chain is between 2,000 and 8,000, in the present case the x radicals X and the y radicals Y being statistically distributed along the $-(X)_x-(Y)_y-$ polymer chain according to polymerization kinetics.

As an example of compounds, the radical of which is represented by X in the above general formula, there may, in particular, be mentioned: allyl alcohol, acrylic acid, methacrylic acid, maleic acid, fumaric acid, acrylaminoglycolic acid, acrylic and methacrylic esters of diols, such as 2-hydroxyethyl acrylate and methacrylate, 2-hydroxypropyl acrylate and methacrylate, 3-hydroxypropyl acrylate and methacrylate, 4-hydroxybutyl acrylate and methacrylate etc., glycidyl acrylate and methacrylate, maleic anhydride, itaconic anhydride, methyl, ethyl, propyl, butyl, isobutyl and 2-ethylhexyl monomaleates and monofumarates etc., N-methylol-(meth)acrylamide and its alkoxylated derivatives, such as N-butoxymethyl-(meth)acrylamide, N-methoxymethyl-(meth)acrylamide, diacetone-(meth)acrylamide etc.

As examples of compounds, the radical of which is represented by Y in the above general formula, there may be mentioned the alkyl esters of acrylic and methacrylic acid, such as methyl, ethyl, butyl, 2-ethylhexyl acrylate and/or methacrylate etc., acrylamide and methacrylamide, acrylonitrile and methacrylonitrile, vinyl acetate, styrene, alpha-methylstyrene, vinyl ethers etc. These compounds may be used alone or in mixtures, provided that the $-(X)_x-(Y)_y-$ polymer chain thus obtained has a Tg between about 40°C. and about 80°C.

In semi-telechelic polymers, V represents a hydrogen atom and this hydrogen atom originates from the SH group of a transfer agent ZH of the mercaptan type which carries at least one additional functional group, such as thioglycolic acid, thiolactic acid, 3-mercaptopropionic acid, thiomalic acid (Z contains a COOH group), beta,-mercaptoethanol, 1-thioglycerol (Z contains an OH group), cysteine or its alkyl esters, cysteamine etc. (Z contains an $NH_2$ group). Other suitable transfer agents include alkyl, aryl, aralkyl and cycloalkyl disulfides, dixanthogenates and dithioxanthogenates which carry at least one additional functional group.

On the other hand, in telechelic polymers, V represents Z and this radical originates from a radical polymerization initiator carrying two COOH groups, such as 4,4'-azo-bis(4-cyanopentanoic acid) two OH groups, such as 3,3'-azo-bis(3-cyano-butanol) two $NH_2$ groups, etc. During initiation, the molecule is split into two radicals carrying functional groups, one of these two radicals constitutes V (V = Z) and the other Z.

With regard to the $-(X)_x-(Y)_y-$ linear polymer chain, it is to be understood that the x molecules of X and the y molecules of Y are statistically distributed along the chain according to polymerization kinetics; consequently we are not here dealing with blocks containing x molecules of X and blocks containing y molecules of Y. As already indicated above, the value of x is between 0 and 10, while y is the number of molecules of Y which must be used to ensure that the linear polymer chain will have a molecular weight of from 2,000 to 8,000. Y may be represented by one or more of the monomers indicated above, the essential condition being that this monomer or these monomers should provide a polymer complying with the above general formula and having a glass transition temperature Tg between about 40°C. and about 80°C.

The polymers of the general formula given above are prepared by techniques which are known per se for solution polymerization in an organic solvent or suspension polymerization in an aqueous medium. Thus, in the case of the preparation of semi-telechelic polymers by polymerization in organic solution, the monomers the radicals of which are represented by X and Y are copolymerized in an inert organic solvent, for example benzene, toluene, xylenes, dioxane, tetrahydrofuran, methyl ethyl ketone, methyl isobutyl ketone, isopropanol, isobutanol, n-butanol, isoamyl alcohol etc., in an inert gaseous atmosphere, for example, nitrogen, carbon dioxide, argon, methane etc., in the presence of a small amount of a radical polymerization initiator, for example, benzoyl peroxide, lauroyl peroxide, acetylcyclohexane-sulfonyl peroxide, diisobutyryl peroxide, decanoyl peroxide, t-butyl hydroperoxide, di-(2-ethylhexyl)peroxydicarbonate, diisopropyl peroxydicarbonate, t-butyl peroxypivalate, azo-bis-(isobutyronitrile), etc., and a substantial amount of the chain transfer agent forming the radical Z defined above. The small amount of initiator can represent less than 0.1% by weight of the semi-telechelic polymer, while the substantial amount of transfer agent Z can represent from 1 to 4% by weight of the semi-telechelic polymer; polymers are thus obtained which contain at least 98% by weight of semi-telechelic chains.

On the other hand, in order to prepare a substantially telechelic polymer by solution polymerization, the operation is carried out as for the preparation of the semi-telechelic polymer described above but replacing the radical polymerization initiator of the type mentioned and the chain transfer agent forming the radical Z by a radical polymerization initiator carrying two COOH, OH, $NH_2$, etc. groups, such as 4,4'-azo-bis(4-cyaniopentanic acid) etc.

In the Table given below, there are given various examples of semi-telechelic and telechelic acrylic polymers which can be used in the thermosetting acrylic powders according to the present invention.

In this Table, the following abbreviations are used:
AA : acrylic acid
AAm : acrylamide
AB : butyl acrylate
AE : ethyl acrylate    AHB :hydroxybutyl acrylate
AM :maleic anhydride
BMMA : butoxymethyl-methacrylamide
MAM : methyl methacrylate
MAG : glycidyl methacrylate
Sty : styrene
$R_1$ : 2-cyano-isopropyl radical originating from azo-bis-isobutyronitrile $R_2$ : phenyl radical originating from benzoyl peroxide
V : hydrogen originating from beta-mercaptoethanol when Z carries an OH group,
hydrogen originating from thioglycolic acid when Z carries a COOH group,
hydrogen originating from cysteamine when Z carries an $NH_2$ group,
COOH originating from 4,4'-azo-bis-(4 cyanopentanoic acid) when Z carries a COOH group.
Z : radical carrying an OH group originating from beta-mercaptoethanol,
radical carrying a COOH group originating from thioglycolic acid,
radical carrying an $NH_2$ group originating from cysteamine,
radical carrying a COOH group originating from 4,4'-azo-bis-(4-cyanopentanoic acid)

The mean molecular weight $M_n$ indicated in the Table was determined with a vapor pressure osmometer. The numerical values indicated in columns V, X, Y and Z are the number of moles of starting materials used to supply the V, X, Y and Z radicals.

TABLE

| V | | X | | Y | | Z | | $M_n$ |
|---|---|---|---|---|---|---|---|---|
| I. Semi-telechelic polymers. | | | | | | | | |
| H | 1 | AA | 2.91 | MAM | 22.75 | OH | 0.98 | 3500 |
| | | | | AE | 9.1 | $R_1$ | 0.02 | |
| H | 1 | AA | 2.91 | MAM | 22.75 | COOH | 0.98 | 3500 |
| | | | | AE | 9.1 | $R_1$ | 0.02 | |
| H | 1 | AA | 2.91 | AE | 9.1 | $NH_2$ | 0.98 | 3500 |
| | | | | MAM | 22.75 | $R_1$ | 0.02 | |
| H | 1 | AHB | 5.15 | MAM | 29.25 | OH | 0.98 | 4500 |
| | | | | AAm | | | | |
| | | | | AE | 4.27 | $R_2$ | 0.02 | 5.7 |
| H | 1 | AHB | 5.15 | AAm | 5.7 | COOH | 0.98 | 4500 |
| | | | | AE | 4.27 | $R_2$ | 0.02 | |
| | | | | MAM | 29.25 | | | |
| H | 1 | BMMA | 4.32 | MAM | 70 | OH | 0.98 | 3700 |
| | | | | AE | 10 | $R_1$ | 0.02 | |
| H | 1 | MAG | 5.35 | MAM | 24.70 | COOH | 0.98 | 3800 |
| | | | | AB | 4.38 | $R_1$ | 0.02 | |
| H | 1 | AM | 4.21 | MAM | 12.60 | COOH | 0.98 | 4200 |
| | | | | Sty | 12.51 | $R_1$ | 0.02 | |
| | | | | AB | 9.36 | | | |
| H | 1 | AM | 4.21 | MAM | 12.60 | $NH_2$ | 0.98 | 4200 |
| | | | | Sty | 12.51 | $R_1$ | 0.02 | |
| | | | | AB | 9.36 | | | |
| II. Telechelic polymers. | | | | | | | | |
| COOH | 1 | AA | 2.91 | MAM | 22.75 | COOH | 1 | 3500 |
| | | | | AE | 9.1 | | | |

The telechelic or semi-telechelic polymers described hereinabove constitute the basic binder (A) of the thermosetting acrylic powders according to the present invention.

These powders contain:
A. 100 parts by weight of binder which is at least one telechelic or semi-telechelic polymer having the general formula (I) above,
B. 0 to 100 parts by weight of cross-linking agent,
C. 0 to 100 parts by weight of pigment,
D. 0 to 200 parts by weight of conventional filler,
E. 0 to 5 parts by weight of catalyst, and
F. 0 to 80 parts by weight of conventional additives for acrylic powders.
B. Cross-linking agents.

Binders according to the present invention which contain

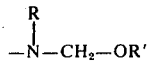

groups (R and R' being a hydrogen atom or a lower alkyl radical) need not necessarily contain cross-linking agents because these groups permit self-cross-linking. The same will apply to the binders according to the present invention which contain, at the same time, terminal COOH groups and OH or epoxy groups in the polymer chain, or conversely terminal OH or epoxy groups and COOH groups in the polymer chain. However, use is generally made of a cross-linking agent which will be selected in accordance with the nature of the reactive groups existing in the binder, the amount used being such that the cross-linking agent will supply 0.7–1.4 reactive groups for each reactive group existing in the chain of the binder. When the binder according to the present invention contains OH groups, the following can, in particular, be used as cross-linking agents:

isocyanates blocked with phenol, caprolactam, oxime, etc., these isocyanates including, for example, isophorone diisocyanate, hexamethylene diisocyanate, dicyclohexylmethane diisocyanate, addition products of these isocyanates in excess to polyhydroxyl compounds, such as glycerol, trimethylolpropane, etc.;

polycarboxylic acid anhydrides, such as trimellitic, pyromellitic, phthalic, tetrahydrophthalic, hexahydrophthalic, etc. anhydrides, or mixtures of these anhydrides with a polyepoxide, such as triglycidyl isocyanurate, etc.;

melamine resins, such as hexamethoxy- or hexabutoxymethylol-melamine, etc.;

epoxy resins obtained by adding epichlorohydrin to bisphenol A, etc.

When the binder according to the present invention contains COOH groups or anhydride groups, the following can be used as cross-linking agents:

glycidyl ethers of polyhydroxyl compounds, such as glycerol, pentaerythritol or bisphenol A triglycidyl ether;

glycidyl esters, such as diglycidyl phthalate or tetrahydrophthalate, diglycidylhydantonine;

diglycidyl amines, such as diglycidylaniline;

triglycidyl isocyanurate.

When the binder according to the present invention contains epoxy groups, the following can, in particular, be used as cross-linking agents:

polybasic carboxylic acids, such as adipic acid, succinic acid, trimellitic acid, etc.;

acrylic resins containing free COOH groups;

saturated polyesters having an acid number between 70 and 200;

acid anhydries such as those mentioned as cross-linking agents for the binders according to the present invention which contain OH groups; etc.

When the binder according to the present invention contains $NH_2$ groups in the semi-telechelic end position, these groups can react with the cross-linking agents of the polyepoxy type which have already been mentioned above.

C. Pigments.

When the thermosetting acrylic powders according to the present invention are intended to be used for the production of transparent coatings, such as varnishes, no pigment is added in the composition of the powders. On the contrary, if the powders are intended to provide coloured coatings, mineral or organic pigments will be added to them, for example titanium dioxide white, carbon black, ultramarine blue, phthalocyanine green, cadmium sulfoselenide red, yellow iron oxide, red iron oxide, etc., these various pigments being incorporated in the powders in an amount of from 1 to 100 parts by weight per 100 parts by weight of the semi-telechelic or telechelic acrylic binder.

D. Fillers.

As in the case of the pigments, no fillers will be added if the acrylic powders are intended to produce transparent coatings. For the production of non-transparent coatings, it is possible to add to them the fillers normally used in the production of coatings, examples of which include the following:

barium sulfate, barium carbonate, calcium carbonate, dolomite, talc, kaolin, calcium silicate, aluminum silicate, diatomaceous earth, micronized mica, etc. Depending on requirements, the fillers may be added to the thermosetting acrylic powders according to the present invention in an amount of from 1 to 200 parts by weight per 100 parts by weight of the semi-telechelic or telechelic acrylic binder.

E. Catalysts.

With a view to accelerating the gelling speed of the acrylic powders according to the present invention so as to obtain a gelling time of about 3–15 minutes, catalysts may be added to them. The nature of the catalyst will vary in accordance with the nature of the cross-linking agents used. Thus, when blocked isocyanates are used, dibutyl tin dilaurate, stannous octoate, etc. may be used as catalyst. When the cross-linking agent is of the epoxy type, the catalyst may be a tertiary amine, a quaternary ammonium compound, a pyrimidine, a piperidine, an imidazole, a benzoguanamine, dicyandiamide, a phenol derivative such as mono- or tridimethylaminophenol, etc. When the cross-linking agent is an alkoxylated melamine resin, use can be made of acid catalysts, such as p-toluene-sulfonic acid, succinic acid, citric acid and, preferably, tetrachlorophthalic acid monobutyl ester, etc. The other cross-linking agents used according to the present invention, for example acid anhydrides, do not require the use of catalysts. The amount of catalyst added is from 0 to 5 parts by weight per 100 parts by weight of the semi-telechelic or telechelic binder.

F. Various additives.

The thermosetting acrylic powders according to the present invention may contain various additives, such as:

anti-agglomerant agents, for example the silicas known commercially under the names Silanox and Syloid 244 (Grace C°);

flowing agents, such as butyl or ethylhexyl polyacrylate, polyvinyl butyral, cellulose acetobutyrate, ketonic resins, etc.;

optical bleaching agents, such as the dioxazine carbazole derivatives;

silicone derivatives having surface active properties, such as the silicone oils;

anti-static agents, such as tetralkyl-ammonium salts and polyoxyethylene phosphates;

reactive plasticizers, such as saturated polyesters with terminal OH or COOh groups, in which the OH number or the acid number is between 70 and 200.

Additives other than the reactive plasticizers are generally used at the rate of from 0 to 10 parts by weight per 100 parts by weight of the binder. Whereas the reactive plasticizers may, without disadvantage, be used at rates up to 80 parts per 100 parts by weight of the binder.

According to the present invention, two known methods can be used for the preparation of thermosetting acrylic powders.

In the first method, and semi-telechelic or telechelic binder and the cross-linking agent, the catalyst, the reactive plasticizers, the pigments, fillers and other additives (if used) are mixed in a dry state. The resulting mixture is passed into an extruder in order to effect homogenization in the molten phase between 80° and 120°C. The mixture leaving the extruder is cooled and ground into a powder having a particle size of between 30 and 120 microns.

In the second method, the various soluble constituents, particularly the binder, are dissolved in a suitable organic solvent, for example in methylene chloride, then the insoluble ingredients, particularly pigments and fillers, are added to the solution, the mixture is ground in order to convert it into a homogeneous suspension and the solvent is evaporated, preferably by the spray drying technique, in order to obtain a powder, the particles of which have a mean size of between 30 and 120 microns.

The thermosetting acrylic powders thus obtained are outstandingly suitable for coating with the aid of an electrostatic spray gun, as well as for fluidized bed coating; they are equally suitable for various powder moulding techniques, such as compression moulding, extrusion moulding, injection moulding, etc.

The baking temperature of the powders according to the present invention varies from 150° to 240°C. and preferably from 180° to 220°C. The baking time varies, depending upon the baking temperature, the nature and the dimensions of the substrate, the coloration of the pigment, etc.; in general, it may vary from 2 to 45 minutes and preferably from 5 to 30 minutes.

The advantages of the thermosetting acrylic powders according to the present invention, which are characterized by the use of a semi-telechelic or telechelic binder, as compared with conventional thermosetting acrylic powders, are very substantial, both from the technological and from the economic point of view. As has already been explained hereinbefore, the conventional binders for thermosetting acrylic powders constitute an arrangement of macromolecular chains in which the cross-linking groups are statistically distributed. In other words, certain chains have a suitable number of reactive sites but the others contain an excess or a deficiency thereof. Consequently, if there is simply added the stoichiometrically necessary amount of cross-linking agent, calculated in relation to the number of reactive sites, there will be obtained a heterogeneous mixture of normally cross-linked polymers, excessively cross-linked polymers and polymers which are cross-linked only very slightly or not at all. This results in the obtaining of a binder which has inferior mechanical properties and a substantial residual solubility, whereas theoretically the binder should have been made practically insoluble by cross-linking. In order to combat these defects, it is usual to add an excess of monomers carrying cross-linking groups but this entails additional expense, increases the heterogeneity of the cross-linked binder and impairs the mechanical properties.

The main advantage of the binders used according to the present invention, as compared with traditional binders, is that they are composed of macromolecular chains, practically all of which contain at least one cross-linking site, namely, a site which is situated at one end (semi-telechelic) or at both ends (telechelic) of each macromolecular chain, in addition to cross-linking sites which exist along the macromolecular chain. In addition, these terminal cross-linking sites are more reactive than those which are situated inside the chain because of reduced steric hindrance. Finally, from the economic point of view, the cross-linking sites (provided by the chain transfer agents) are less expensive than those which are introduced into the macromolecular chain by the monomers the radicals of which are designated X in the above-given general formula. These advantages have the practical consequence of reduced consumption of cross-linking agent, while, nevertheless, complete cross-linking is obtained, which leads to coatings having better physical and chemical properties, while the cost price of these coatings is reduced. In the Examples given hereinafter by way of illustration of the present invention, these advantages will be clearly demonstrated. Unless otherwise indicated, the parts given in the Examples are parts by weight.

EXAMPLE 1.

16 kg. toluene are heated to the boiling point, under reflux, in an atmosphere of nitrogen in a 50-liters reactor provided with an anchor-type agitator. A mixture composed of 13 kg. methyl methacrylate, 5.2 kg. ethyl acrylate, 1.8 acrylic acid, 20 g. azo-bis-isobutyronitrile (AIBN) and 0.6 thioglycolic acid are introduced over a period of 2 hours, with the aid of a metering pump. Within the space of 3 hours, a solution of 40 g. AIBN in 4 kg. toluene is then added. Reflux boiling is continued for a further hour, the polymer solution is removed from the reactor and the polymer is collected in a thin layer evaporator.

The semi-telechelic binder obtained in this manner has the following characteristics: osmometric molecular weight: 3400; acidity: 1.54 meq (milliequivalents) of $H^+$/g; Tg: 55°C.

A thermosetting acrylic powder formulation is then prepared which contains the following constituents:
  semi-telechelic binder: 100 parts
  triglycidyl isocyanurate (TGIC): 16 parts
  titanium dioxide RHD6 (British Titan Products C°
  Ltd.): 40 parts
  polyethylhexyl acrylate (flowing agent): 1 part
  ketonic resin based on cyclohexanone (flow agent): 5 parts When baked for 10 minutes at 180°C., this pulverulent formulation gives a film having a high gloss, a very good resistance to solvents and good mechanical properties, as is shown by the following experimental results obtained with a film of 65 microns thickness applied to a phosphated steel sheet with a thickness of 0.4 mm.
  Appearance : well spread film
  Gas bubbles : none
  Adherence : cross-hatch test: 0.5
  Gardner gloss at an angle of 60° : 88%
  Conical mandrel : 3 mm.
  Erichsen slow penetration test : 8.5 mm.
  Resistance to methyl ethyl ketone for 60 seconds at 25°C.: no softening.

Similar results are obtained when TGIC is replaced by an equivalent amount of other epoxy compounds, such as glycerol triglycidyl ether pentaerythritol triglycidyl ether, diglycidyl phthalate or diglycidylhydantoine, while maintaining a COOH/epoxy stoichiometric ratio equal to 1.

The same results are obtained when there are added to the composition (per 100 parts of semi-telechelic binder) 5 to 80 parts of a carboxyl polyester having a molecular weight of 1500, a Tg of 45°C. and an acid number of 100, prepared from 15 equivalents of isophthalic acid, 15 equivalents of trimellitic anhydride and 25 equivalents of neopentyl glycol.

EXAMPLE 2 (reference)

The process described in Example 1 is repeated but the thioglycolic acid is replaced by 0.4 kg. n-butyl-mercaptan.

The binder obtained in this manner is not (semi-)telechelic; it has a molecular weight identical to that of the binder prepared in Example 1 but its acid number is only 1.24 meq/g.

The powder formulated, applied and baked under the conditions described in Example 1 provides a film, the resistance of which to solvents and mechanical properties are markedly inferior:
  Appearance : well spread film
  Gas bubbles : none
  Adherence : cross-hatch test : 1
  Gardner gloss at an angle of 60° : 85%
  Conical mandrel : cracking at 6 mm.
  Erichsen test : 5 mm.
  Resistance to methyl ethyl ketone for 60 seconds at 25°C.: medium softening.

EXAMPLE 3.

By the process described in Example 1, a semi-telechelic binder is prepared from the following components:
  methyl methacrylate : 700 parts
  ethyl acrylate : 158 parts
  beta-hydroxyethyl acrylate : 142 parts
  beta-mercaptoethanol : 20 parts
  azo-bis-isobutyronitrile : 3 parts.

The binder prepared in this manner has the following characteristics: osmometric molecular weight: 3400; Tg: 53°C.; Tr (softening temperature): 95°C.; hydroxyl number: 1.30 meq of OH/g.

The formulation of the powder comprises:

| | |
|---|---|
| semi-telechelic binder | 459 parts |
| hexamethylene diisocyanate blocked with caprolactam | 133 parts |
| polyethylhexyl acrylate (flowing) | 4.6 parts |
| stannous octoate | 2.9 parts |
| titanium dioxide RHD 6 | 400 parts |

When baked for 15 minutes at 200°C., the powder gives a film having similar properties to those described in Example 1.

In this formulation of the powder, the hexamethylene diisocyanate blocked with caprolactam may be replaced by isophorone diisocyanate blocked with caprolactam (Veba 1870) or by hexamethoxymethylol-melamine (Cymel 300) (in the latter case, stannous octoate is replaced by one part of tetrachlorophthalic acid monobutyl ester) or a mixture of pyromellitic anhydride and phthalic anhydride (60/40).

EXAMPLE 4 (reference).

For the preparation of the binder, beta-mercaptoethanol of Example 3 is replaced by 20 parts of n-butyl-mercaptan.

The binder has an OH number of 1.02 meq of OH/g; the mechanical properties and resistance to solvents of the film obtained by baking are inferior to those of Example 3.

EXAMPLE 5

By the same process as in Example 1, a mixture of 500 parts methyl methacrylate, 250 parts butyl acrylate, 190 parts styrene, 60 parts maleic anhydride, 3 parts of azo-bis-isobutyronitrile and 20 parts thioglycolic acid is copolymerized.

The semi-telechelic binder obtained has an anhydride number of 0.636 meq/g. and a total acid number of 1.318 meq/g. The Tg is 69°C. and the Tr is 100°C.

With this binder, a powder is formulated in the following proportions:
Binder : 500 parts
TGIC : 67.8 parts
dicyandiamide : 10.3 parts
titanium dioxide RHD 6 : 400 parts
polyethylhexyl acrylate : 5 parts The film obtained by baking at 200°C. for 20 minutes has good mechanical properties. The dicyandiamide may, without disadvantage, be replaced by an equivalent amount of triethanolamine, 2-ethyl-4-methylimidazole, N-butyl-imidazole or mono- or tridimethylaminophenol.

The TGIC may also be replaced by other epoxy compounds, as described in Example 1.

EXAMPLE 6 (reference)

Example 5 is repeated except that the thioglycolic acid is replaced by 40 parts of t-butyl-mercaptan.

When the (non-telechelic) binder thus obtained is used in the powder formulation of Example 5, the powder forms, after baking, a film which has decidedly poorer mechnical properties and resistance to solvents.

EXAMPLE 7

Under the conditions described in Example 1, 650 parts methyl methacrylate, 100 parts glycidyl methacrylate, 250 parts butyl acrylate, 3 parts azo-bis-isobutyronitrile and 35 parts 3-mercaptopropionic acid are copolymerized.

100 parts of this semi-telechelic binder are formulated with 9 parts adipic acid, 1 part polyethylhexyl acrylate, 1 part of an antiagglomerant (Syloid 244 of Grace C°), 200 parts barium sulfate and 100 parts cadmium sulfoselenide (red pigment).

The bright red, glossy coating obtained in this manner after baking for 20 minutes at 180°C. has excellent mechanical properties and resistance to solvents.

In the above formulation, the adipic acid may be replaced by other polycarboxylic acids, saturated polyesters having terminal COOH groups such as the one described in Example 1 or by a carboxylic acrylic resin, while maintaining an epoxy/carboxyl ratio equal to 1.

EXAMPLE 8 (reference)

In Example 7, the 3-mercaptopropionic acid is replaced by 60 parts azo-bis-isobutyronitrile, thus making it possible to obtain the same molecular weight as that of the binder in Example 7.

Nevertheless, when this binder is formulated as in Example 7, the powder thus obtained gives a film which has poorer mechanical characteristics.

EXAMPLE 9

A semi-telechelic binder is prepared as in Example 3 but replacing the beta-mercaptoethanol by 25 parts 1-thioglycerol (Thiovanol of Evans Chemetics Inc.). The binder thus obtained has a hydroxyl number of 1.65 meq of OH/g.

After formulation of a powder with the use of this binder and using hexamethoxymethylol-melamine (Cymel 300) as cross-linking agent as in Example 3, in the stoichiometric ratio 1/1 referred to the number of OH groups of the polymer, this powder provides, when baked, a film which has excellent mechanical properties and resistance to solvents.

EXAMPLE 10

A telechelic binder is prepared in the following manner: a mixture of 432 g. methyl methacrylate, 51 g. ethyl acrylate, 90 g. 4,4'-azo-bis(4-cyano-pentanoic acid) and 1017 g. tert.-butanol, previously heated to 70°C., is introduced, over a period of one hour, into a 2-liters double walled reactor provided with an anchor type agitator, a thermometer and a reactant introduction tube. On completion of the addition of this mixture, heating is continued at the same temperature, with agitation, for 15 minutes. The mixture is then precipitated with hexane and the precipitate is filtered off and dried. There are thus isolated 310 g. of a white polymer (yield 64%) having the following characteristics: intrinsic viscosity: 0.072 dl/g; Tg: 62°C.; mean osmometric molecular weight: 4000; acidity: 0.45 meq. of $H^+$/g. The polymer contains an average of 1.9 COOH groups per molecule.

573.6 parts of this telechelic binder are formulated with 26 parts TGIC, 5 parts polyethylhexyl acrylate and 400 parts titanium dioxide RHD 6.

After baking for 20 minutes at 200°C., the powder obtained in this manner provides a film having good mechanical properties and a high gloss.

We claim:

1. Telechelic or semi-telechelic polymers, the average composition of which corresponds to the formula

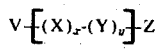

wherein
V is a hydrogen atom or Z;
X is the radical originating from the opening of the double bond of an ethylenically unsaturated monomer selected from the group consisting of acrylic acid, methacrylic acid, maleic anhydride, a hydroxy-$C_2$-$C_4$-alkyl acrylate, a hydroxy-$C_2$-$C_4$-alkyl methacrylate, glycidyl acrylate, glycidyl methacrylate, N-methylolacrylamide, N-methylol-methacrylamide, an N-$C_1$-$C_4$-alkoxymethylacrylamide, and an N-$C_1$-$C_4$-alkoxymethyl-methacrylamide;
Y is the radical originating from the opening of the double bond of an ethylenically unsaturated monomer selected from the group consisting of a $C_1$-$C_8$-alkyl acrylate, a $C_1$-$C_8$-alkyl methacrylate, acrylamide, methacrylamide, styrene and alpha-methyl-styrene;
Z is the radical derived by removing a hydrogen atom from the SH group of a mercaptan selected from the group consisting of thioglycolic acid, thiolactic acid, mercaptopropionic acid, thiomalic acid, beta-mercaptoethanol, thioglycerol, cysteamine, cysteine and the lower alkyl esters of cystein, when V is a hydrogen atom, or Z is the radical originating from the decomposition of a radical polymerization initiator selected from the group consisting of 4,4′-azo-bis(4-cyanopentanoic acid) and 3,3′-azo-bis(3-cyanobutanol) when V = Z;

$x$ is a number between 0 to 10;

$y$ is a positive number and represents the required number of molecules of Y to ensure that the molecular weight of the polymer chain is between 2,000 and 8,000; the $x$ radicals X and the $y$ radicals Y being statistically distributed along the $-(X)_x-(Y)_y-$ polymer chain according to polymerization kinetics.

2. Semi-telechelic polymers according to claim 1, wherein V is a hydrogen atom and Z is the radical derived from a mercaptan selected from the group consisting of thioglycolic acid, thiolactic acid, mercapto-propionic acid, thiomalic acid, beta-mercaptoethanol, thioglycerol, cysteamine, cysteine and the lower alkyl esters of cysteine.

3. Telechelic polymers according to claim 1, wherein V=Z and Z is the radical originating from a radical polymerization initiator selected from the group consisting of 4,4′-azo-bis(4-cyanopentanoic acid) and 3,3′-azo-bis(3-cyanobutanol).

4. A semi-telechelic polymer having a molecular weight between 2000 and 8000 selected from the group consisting of:

the polymerization product of 1 mole acrylic acid, 7.5 moles methyl methacrylate, 3 moles ethyl acrylate and 0.33 mole beta-mercaptoethanol;

the polymerization product of 1 mole acrylic acid, 7.5 moles methyl methacrylate, 3 moles ethyl acrylate and 0.33 mole thioglycolic acid;

the polymerization product of 1 mole acrylic acid, 7.5 moles methyl methacrylate, 3 moles ethyl acrylate and 0.33 mole cysteamine;

the polymerization product of 1 mole hydroxybutyl acrylate, 6 moles methyl methacrylate, 1 mole ethyl acrylate, 1 mole acrylamide and 0.2 mole betamercaptoethanol;

the polymerization product of 1 mole hydroxybutyl acrylate, 6 moles methyl methacrylate, 1 mole ethyl acrylate, 1 mole acrylamide and 0.2 mole thioglycolic acid;

the polymerization product of 1 mole butoxymethylmethacrylamide, 16 moles methyl methacrylate, 2.3 moles ethyl acrylate and 0.25 mole beta-mercaptoethanol;

the polymerization product of 1 mole glycidyl methacrylate, 5 moles methyl methacrylate, 1 mole butyl acrylate and 0.2 mole thioglycolic acid;

the polymerization product of 1 mole maleic anhydride, 3 moles methyl methacrylate, 3 moles styrene, 2.25 moles butyl acrylate and 0.25 mole thioglycolic acid;

the polymerization product of 1 mole maleic anhydride, 3 moles methyl C = C<3 moles styrene, 2.25 moles butyl acrylate and 0.25 mole cysteamine;

the polymerization product of 7 moles methyl methacrylate, 1.4 moles ethyl acrylate, 1 mole beta-hydroxyethyl acrylate and 0.25 mole betamercaptoethanol;

the polymerization product of 7 moles methyl methacrylate, 1.4 moles ethyl acrylate, 1 mole beta-hydroxyethyl acrylate and 0.25 mole thioglycerol;

the polymerization product of 5 moles methyl methacrylate, 2 moles butyl acrylate, 1.8 moles styrene, 0.6 mole maleic anhydride and 0.2 mole thioglycolic acid; and the polymerization product of 13 moles methyl methacrylate, 1.25 moles glycidyl methacrylate, 4 moles butyl acrylate and 0.66 mol 3-mercaptopropionic acid.

5. A telechelic polymer having a molecular weight between 2000 and 8000 selected from the group consisting of:

the polymerization product of 1 mole acrylic acid, 7.5 moles methyl methacrylate, 3 moles ethyl acrylate and 0.33 mole 4,4′-azo-bis(4-cyanopentanoic acid); and the polymerization product of 8.6 moles methyl methacrylate, 1 mole ethyl acrylate, and 0.6 mole 4,4′-azo-bis(4-cyanopentanoic)acid.

6. A thermosetting acrylic powder composition comprising:

A. 100 parts by weight of at least one binder consisting of a telechelic or semi-telechelic polymer according to claim 1.
B. 0 to 100 parts by weight of cross-linking agent,
C. 0 to 100 parts by weight of pigment,
D. 0 to 100 parts by weight of conventional filler,
E. 0 to 5 parts by weight of catalyst, and
F. 0 to 80 parts by weight of conventional additives for an acrylic powder composition.

7. A thermosetting acrylic powder composition according to claim 6 wherein the cross-linking agent (B) is selected from the group consisting of isocyanates blocked with phenol, caprolactam or oxime, polycarboxylic acid anhydrides, melamine resins, epoxy resins, glycidyl ethers of polyhydroxyl compounds, glycidyl esters, diglycidylamines, triglycidyl isocyanurate, polybasic carboxylic acids, acrylic resins containing free COOH groups and saturated polyesters having an acid number between 70 and 200.

8. A thermosetting acrylic powder composition according to claim 6 wherein the pigment (C) is selected from the group consisting of titanium dioxide, carbon black, ultramarine blue, phthalocyanine green, cadmium sulfoselenide, yellow iron oxide and red iron oxide.

9. A thermosetting acrylic powder composition according to claim 6, wherein the filler (D) is selected from the group consisting of baryum sulfate, baryum carbonate, calcium carbonate, dolomite, talc, kaolin, calcium silicate, aluminium silicate, diatomaceous earth and micronized mica.

10. A thermosetting acrylic powder composition according to claim 6, wherein the catalyst (E) is selected from the group consisting of dibutyl-tin laurate, stannous octoate, a tertiary amine, a quaternary ammonium compound, a pyrimidine, a piperidine, an imidazole, a benzoguanamine, dieyandiamide, mono- or tri-dimethylaminophenol, p-toluenesulfonic acid, succinic acid, citric acid and tetrachlorophthalic acid monobutyl ester.

11. A thermosetting acrylic powder composition according to claim 6, wherein the additives (F) are at least one member selected from the group consisting of anti-agglomerant agents, flowing agents, optical bleaching agents, silicone oils, antistatic agents, and reactive plasticizers.

12. An article coated with a cured film of the thermosetting acrylic powder composition according to claim 6.

13. An article obtained by molding a thermosetting acrylic powder composition according to claim 6.

* * * * *